(12) United States Patent
Rho et al.

(10) Patent No.: US 10,569,498 B2
(45) Date of Patent: Feb. 25, 2020

(54) SANDWICH PANEL, METHOD FOR MANUFACTURING THE SAME, AND SANDWICH PANEL STRUCTURE

(71) Applicant: LG Hausys, Ltd., Seoul (KR)

(72) Inventors: Sang-Hyun Rho, Anyang-si (KR); Dong-Eung Kim, Gunpo-si (KR); Ji-Won Lim, Seoul (KR)

(73) Assignee: LG HAUSYS, LTD., Seoul (KR)

(*) Notice: Subject to any disclaimer, the term of this patent is extended or adjusted under 35 U.S.C. 154(b) by 176 days.

(21) Appl. No.: 15/562,773

(22) PCT Filed: Mar. 29, 2016

(86) PCT No.: PCT/KR2016/003186
§ 371 (c)(1),
(2) Date: Sep. 28, 2017

(87) PCT Pub. No.: WO2016/159628
PCT Pub. Date: Oct. 6, 2016

(65) Prior Publication Data
US 2018/0361701 A1 Dec. 20, 2018

(30) Foreign Application Priority Data

Apr. 3, 2015 (KR) .................. 10-2015-0047430

(51) Int. Cl.
*B32B 7/02* (2019.01)
*B32B 3/30* (2006.01)
(Continued)

(52) U.S. Cl.
CPC .................. *B32B 3/30* (2013.01); *B32B 3/12* (2013.01); *B32B 3/28* (2013.01); *B32B 5/022* (2013.01);
(Continued)

(58) Field of Classification Search
CPC .......... B32B 15/14; B32B 15/18; B32B 15/20; B32B 2250/40; B32B 2260/021;
(Continued)

(56) References Cited

U.S. PATENT DOCUMENTS 4,034,134 A 7/1977 Gregorian et al.
4,267,219 A * 5/1981 Ueno ................. D06Q 1/14
428/327

(Continued)

FOREIGN PATENT DOCUMENTS

CN 1274493 C 9/2006
DE 102012106521 A1 1/2014
(Continued)

OTHER PUBLICATIONS

International Search Report for PCT/KR2016/003186 dated Jul. 25, 2016.
(Continued)

*Primary Examiner* — Lawrence D Ferguson
(74) *Attorney, Agent, or Firm* — Hauptman Ham, LLP

(57) ABSTRACT

The present invention provides a sandwich panel and a sandwich panel structure formed by welding a plurality of the sandwich panels, each sandwich panel comprising: a flocking core layer; and skin layers laminated on both surfaces of the flocking core layer, respectively, wherein the sandwich panel comprises at least one contact portion, at which the two skin layers abut each other. In addition, the present disclosure provides a method for manufacturing a sandwich panel, the method comprising the steps of: preparing a sandwich panel comprising a flocking core layer and skin layers laminated on both surfaces of the flocking core layer, respectively; and applying heat and pressure to at least one surface of the skin layers, thereby forming at least one contact portion.

15 Claims, 3 Drawing Sheets

(51) Int. Cl.
| | | |
|---|---|---|
| *B32B 5/02* | (2006.01) | |
| *B32B 7/12* | (2006.01) | |
| *B32B 15/14* | (2006.01) | |
| *B32B 3/12* | (2006.01) | |
| *E04C 2/36* | (2006.01) | |
| *B32B 3/28* | (2006.01) | |
| *B32B 15/20* | (2006.01) | |
| *B32B 15/18* | (2006.01) | |
| *B32B 37/06* | (2006.01) | |
| *B32B 37/10* | (2006.01) | |
| *B32B 37/12* | (2006.01) | |
| *E04C 2/292* | (2006.01) | |
| *E04C 2/32* | (2006.01) | |

(52) U.S. Cl.
CPC ............... *B32B 7/12* (2013.01); *B32B 15/14* (2013.01); *B32B 15/18* (2013.01); *B32B 15/20* (2013.01); *B32B 37/06* (2013.01); *B32B 37/10* (2013.01); *B32B 37/1284* (2013.01); *E04C 2/292* (2013.01); *E04C 2/324* (2013.01); *E04C 2/36* (2013.01); *B32B 2250/40* (2013.01); *B32B 2260/021* (2013.01); *B32B 2260/046* (2013.01); *B32B 2262/0261* (2013.01); *B32B 2307/202* (2013.01); *B32B 2607/00* (2013.01)

(58) Field of Classification Search
CPC ...... B32B 2260/046; B32B 2262/0261; B32B 2307/202; B32B 2607/00; B32B 37/06; B32B 37/10; B32B 37/1284; B32B 3/12; B32B 3/28; B32B 3/30; B32B 5/022; B32B 7/12; E04C 2/292; E04C 2/324; E04C 2/36
See application file for complete search history.

(56) References Cited

U.S. PATENT DOCUMENTS

| | | |
|---|---|---|
| 2003/0082335 A1 | 5/2003 | Clyne et al. |
| 2003/0213178 A1 | 11/2003 | Fanucci et al. |
| 2009/0115097 A1 | 5/2009 | de Groot |
| 2013/0280472 A1 | 10/2013 | Preisler et al. |

FOREIGN PATENT DOCUMENTS

| | | |
|---|---|---|
| EP | 0333685 A2 | 9/1989 |
| JP | H04223157 A | 8/1992 |
| JP | H09-131788 A | 5/1997 |
| JP | 2011-200337 A | 10/2011 |
| KR | 10-2000-0022330 A | 4/2000 |
| KR | 10-0786335 B1 | 12/2007 |
| KR | 10-2009-0064837 A | 6/2009 |

OTHER PUBLICATIONS

Korean Office Action dated Aug. 13, 2018, in connection with the Korean Patent Application No. 10-2015-0047430.
The extended European search report dated Feb. 8, 2018 in connection with the counterpart European Patent Application No. 16773409.4.
Chinese Office Action dated Jan. 21, 2019, in connection with the Chinese Patent Application No. 201680020827.6.

* cited by examiner

SANDWICH PANEL, METHOD FOR MANUFACTURING THE SAME, AND SANDWICH PANEL STRUCTURE

CROSS REFERENCE TO RELATED APPLICATION

This present application is a national stage filing under 35 U.S.C. § 371 of PCT application number PCT/KR2016/003186 filed on Mar. 29, 2016 which is based upon and claims the benefit of priority to Korean Patent Application Nos. 10-2015-0047430 filed on Apr. 3, 2015 in the Korean Intellectual Property Office. The disclosures of the above-listed applications are hereby incorporated by reference herein in their entirety.

TECHNICAL FIELD

The present disclosure relates to a sandwich panel, a method for manufacturing the sandwich panel, and a sandwich panel structure.

BACKGROUND ART

Conventional sandwich panels have a core material manufactured by using a material such as balsa wood or foamed plastic for lightweight or by using a honeycomb structure made of a metal material for improvement of sound insulation, flame retardancy, etc. However, general sandwich panels including such a core material have problems in that interlayer bonding force is weak or strength is weak, and thus, moldability is poor when it is processed into various shapes. In addition, there have problems in that when a metal material is included as a core layer for a process requiring electrical conduction between panels, such as welding, the weight of the sandwich panel becomes too heavy and the manufacturing cost increases.

For example, Korean Patent No. 10-0786335 discloses a sandwich panel for interior and exterior materials, including a balsa wood panel. The balsa wood panel includes a unit panel and a heterogeneous material panel formed of any one of a cork material and a resin material, and has purposes for lightweight and improvement of sound insulation. In addition, Korean Laid-open Patent Publication No. 10-2009-0064837 discloses a sandwich panel for a vehicle having a paper honeycomb core and support sheets bonded to both sides of the honeycomb core, including adhesive layers interposed therebetween. The sandwich panel having the honeycomb core is intended to secure rigidity relative to weight and the low manufacturing cost and to obtain an effect of in-mold molding. As described above, the sandwich panel having the balsa wood or the honeycomb core has limitations in view of prevention of interlayer delamination and prevention of wrinkle occurrence in implementing various shapes through molding including a large degree of modification. Therefore, there is a need for research on a sandwich panel capable of overcoming the structural limitations for excellent moldability while simultaneously securing a high level of support performance and mechanical properties.

DISCLOSURE

Technical Problem

It is an aspect of the present disclosure to provide a sandwich panel having a high level of moldability while having excellent support rigidity and mechanical properties.

It is another aspect of the present disclosure to provide a sandwich panel structure.

It is a further aspect of the present disclosure to provide a method for manufacturing the sandwich panel.

Technical Solution

In order to solve the above problems, one embodiment of the present disclosure may provide a sandwich panel including: a flocking core layer; and skin layers stacked on both sides of the flocking core layer, respectively, wherein the sandwich panel further includes at least one contact portion abutted by both skin layers.

The contact portion may be formed in the shape of a groove by applying a pressure to at least one surface of the skin layer.

The contact portion may have a depth of the groove in the range of 0.5 mm to 2.0 mm.

The contact portion may have the number of 4 to 16 per unit area.

The flocking core layer may include fibers that are flocked to an adhesive layer.

The fibers may have an average cross-sectional diameter of 20 μm to 70 μm.

The fibers may have an average length of 0.5 mm to 3 mm.

The fibers may include at least one selected from the group consisting of a carbon fiber, a glass fiber, a metal fiber, a polyamide fiber, a polyethylene fiber, a polyester fiber, and a combination thereof.

The adhesive layer may include at least one selected from the group consisting of an epoxy-based adhesive, an acrylic adhesive, a silicone-based adhesive, a rubber-based adhesive, and a combination thereof.

The skin layer may include at least one selected from the group consisting of aluminum, galvanized steel sheet (GI), stainless steel, magnesium, and a combination thereof.

The skin layer may have a thickness of 0.1 mm to 1.0 mm.

The flocking core layer may have a thickness of 0.5 mm to 2.0 mm.

Another embodiment of the present disclosure may provide a sandwich panel structure formed by welding the sandwich panel as described above and at least one selected from the group consisting of a metal layer, the sandwich panel and a combination thereof.

At least two the sandwich panels may be welded each other.

The sandwich panel structure may have an electrical conductivity of 100 S/cm to 1000 S/cm.

The metal layer may include at least one selected from the group consisting of iron, stainless steel (SUS), aluminum, magnesium, copper, and a combination thereof.

A further embodiment of the present disclosure may provide a method for manufacturing a sandwich panel, the method including: preparing a sandwich panel comprising a flocking core layer and skin layers stacked on both sides of the flocking core layer, respectively; and applying heat and pressure to at least one surface of the skin layers to form at least one contact portion.

In preparing the sandwich panel, the flocking core layer may be formed by an electrostatic deposition of fibers.

In forming the contact portion, the contact portion may be formed by pressing the flocking core layer so that the skin layers on both sides are abutted each other.

The forming the contact portion may be performed at a pressure of 0.2 MPa to 1 MPa.

The forming the contact portion may be performed at a temperature of 50° C. to 150° C.

Advantageous Effects

The sandwich panel of the present disclosure may exhibit moldability to be capable of being modified to a high level while having excellent mechanical properties and support rigidity, and at the same time may implement a lightweight effect.

In addition, the sandwich panel structure of the present disclosure may be formed by welding with the sandwich panel or another metal layer, thereby obtaining an advantage of extending an application range.

Further, the method for manufacturing the sandwich panel of the present disclosure provides a method for manufacturing the sandwich panel in a simple manner, thereby making it possible to manufacture the sandwich panel having excellent physical properties with high efficiency.

BEST MODE

Figure 1:
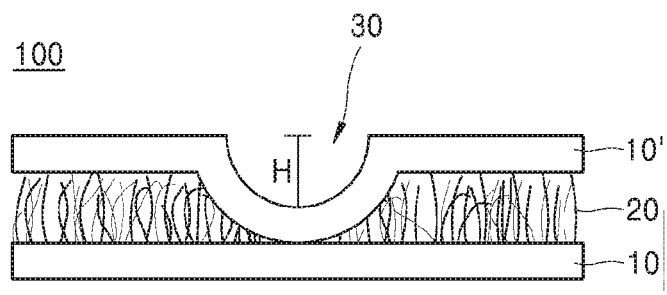
FIG. 1 schematically shows a cross section of a sandwich panel according to an exemplary embodiment of the present disclosure.

Hereinafter, various advantages and features of the present disclosure and methods accomplishing them will become apparent with reference to the following description of Examples. However, the present disclosure is not limited to exemplary embodiment disclosed herein but will be implemented in various forms. The exemplary embodiments are provided by way of example only so that a person of ordinary skill in the art can fully understand the disclosures of the present disclosure and the scope of the present disclosure. Therefore, the present disclosure will be defined only by the scope of the appended claims. Like reference numerals refer to like components throughout the specification.

In the drawings, thicknesses of various layers and regions are exaggerated for clarity. In the drawings, thicknesses of partial layers and regions are exaggerated for convenience of explanation.

It will be understood that when an element such as a layer, a film, a region, or a substrate is referred to as being "on" or "under" another element, it can be directly on or under the other element or intervening elements may also be present. In contrast, it will be understood that when an element is referred to as being "directly on" or "directly under" another element, no other intervening elements are present.

In an exemplary embodiment of the present disclosure, there is provided a sandwich panel including: a flocking core layer; and skin layers stacked on both sides of the flocking core layer, respectively, wherein the sandwich panel further includes at least one contact portion abutted by both skin layers.

FIG. 1 schematically shows a cross section of a sandwich panel 100 according to an exemplary embodiment of the present disclosure. Referring to FIG. 1, the sandwich panel 100 has a structure in which a skin layer 10, a flocking core layer 20, and a skin layer 10' are sequentially stacked, and may include at least one contact portion 30 abutted by the skin layers 10 and 10'.

In general sandwich panels, a core material part corresponding to the flocking core layer 20 is made of a material such as honeycomb, foam, fiber-reinforced plastic (LFT), or the like. In this case, lightweight, sound insulation, flame retardancy, etc., may be secured, but there has been a problem in that a high level of moldability and support performance cannot be secured. In addition, since the electrical conductivity of the general sandwich panel is zero, it is difficult to weld the panels.

The sandwich panel 100 of the present disclosure may include the flocking core layer 20 as a core material, thereby exhibiting excellent support performance and durability while simultaneously securing a high level of moldability as compared to the related art. Further, by including the contact portion 30, a problem that the electrical conductivity of the skin layer is low due to the absence of metal components in the flocking core layer is overcome. As a result, it is possible to achieve excellent rigidity by a good welding between the sandwich panels or other metal layers in laminating thereon.

Figure 2:
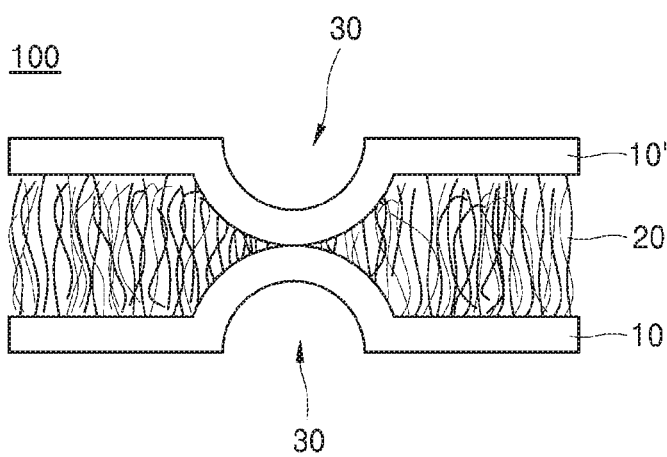
FIG. 2 schematically shows a cross section of a sandwich panel according to another exemplary embodiment of the present disclosure.

Specifically, the contact portion may be formed in the shape of a groove by applying a pressure to at least one surface of the skin layer. The contact portion refers to a portion where the skin layers on both sides are in contact with each other. In one embodiment, the contact portion may be formed on one side of the skin layer (see FIG. 1), and in another embodiment, the contact portion may be formed at the same point on both sides of the skin layer to form an hourglass-like concave shape (see FIG. 2). Therefore, the presence of the contact portion in everywhere of the panel can generate electrical conductivity between the sandwich panels having fibers as a core material, which enables the welding between the sandwich panels or between the sandwich panel and the metal layer.

In FIG. 1, H indicates a depth of the groove in the contact portion, and the depth H of the groove in the contact portion may be about 0.5 mm to about 2 mm. The depth of the groove in the contact portion may be a distance from a surface of the skin layer to a most concaved position of the contact portion in the contact portion formed in the skin layer. Within the above range, welding efficiency of the sandwich panel can be improved.

Also, the number of the contact portions may be about 4 to about 16 per unit area, but is not limited thereto. The number of the contact portions may be appropriately adjusted based on the physical properties or design required by the product.

The term "flocking" as used herein refers to a processing method of depositing or planting a fiber on a predetermined surface. In the present specification, the "flocking core layer" refers to a core layer manufactured by using or utilizing such method.

Referring to FIG. 1, the flocking core layer 20 may include fibers 21 flocked to the adhesive layer 22. In this case, the fibers 21 may be present in a form in which some or all of the respective fiber strands are bonded to the adhesive layer 22. When the respective fiber strands are bonded to the adhesive layer 22, a flocking processing method for depositing or planting the fiber strands on the predetermined surface formed of the adhesive layer 22 may be used or utilized.

As a result, referring to FIG. 1, the flocking core layer 20 may have a structure in which the fibers 21 are planted on the adhesive layer 22. Accordingly, the flocking core layer 20 may excellently support the skin layers 10 stacked on both sides thereof, and may impart excellent moldability and mechanical properties to the sandwich panel 100.

The fibers 21 may specifically include fibers having an average cross-sectional diameter of from about 20 μm to about 70 μm. The fibers 21 may exhibit excellent support rigidity in the flocking core layer 20, thereby allowing the sandwich panel 100 to implement a level of moldability and mechanical properties suitable for processing and use in a variety of applications.

A cross section of the fiber 21 may have an average diameter of about 20 μm to about 70 μm, for example, about 30 μm to about 35 μm. When the average cross-sectional diameter of the fibers is less than the above-described range, the flocking core layer 20 may not secure rigidity sufficient to support the skin layers 10. When the average cross-sectional diameter thereof exceeds the above-described range, the manufacturing cost may be excessively increased, or the contact portion 30 may not formed well, such that the moldability of the sandwich panel may be deteriorated.

An average length of the fibers may be suitably adjusted as needed, but may be, for example, about 0.5 mm to about 3 mm. Since the average length of the fibers satisfies the above-described range, it is advantageous in that the flocking core layer and the sandwich panel may have an appropriate thickness, thereby implementing a slim design and securing a high level of strength at the same time.

The fibers may include at least one selected from the group consisting of a carbon fiber, a glass fiber, a metal fiber, a polyamide fiber, a polyethylene fiber, a polyester fiber, and a combination thereof. For example, the fibers may include a polyamide fiber, a polyethylene fiber, or a polyester fiber. In this case, it is advantageous for the sandwich panel to secure excellent strength and moldability at the same time relative to the manufacturing cost.

The adhesive layer 22 is not particularly limited as long as it can firmly bind the fibers 21 and secure the adhesive force of the skin layer 10 and the flocking core layer 20, but may include, for example, at least one selected from the group consisting of an epoxy-based adhesive layer, an acrylic adhesive layer, a silicone-based adhesive layer, a rubber-based adhesive layer, and a combination thereof.

At this time, the adhesive layer 22 may be a photo-curable adhesive layer or a thermosetting adhesive layer, and may be one which is curable using either a photo-curing method or a thermal curing method, or both.

The skin layer may be formed of a metal material, and may include at least one selected from the group consisting of iron, stainless steel (SUS), aluminum, copper, and a combination thereof. Specifically, the iron may be included in the form of a steel sheet and may include at least one selected from the group consisting of, for example, an electrogalvanized steel sheet (EGI), a cold rolled steel sheet (CR), a galvanized steel sheet (GI), and a combination thereof. For example, the skin layer may include an electrogalvanized steel sheet. In this case, a more advantageous effect can be obtained in terms of corrosion resistance and paintability.

The sandwich panel 100 has a structure in which the skin layer 10', the flocking core layer 20, and the skin layer 10 are sequentially stacked from the top, wherein each of the skin layers 10 and 10' may have a thickness of about 0.1 mm to about 1.0 mm. By maintaining the thickness of the skin layer within the above-described range, it is possible to secure excellent moldability in processing such as bending or welding the sandwich panel.

In addition, the flocking core layer 20 may have a thickness of about 0.5 mm to about 2.0 mm. It is possible to secure an excellent supporting strength by satisfying the thickness of the flocking core layer in the above range and appropriately maintain the structural rigidity of the skin layers stacked on both sides thereof. Further, it is possible to implement the contact portion without physical jamming by not exceeding the above range.

The sandwich panel may be used as various components and applications in fields of architecture, automobile, display device, etc.

The slimness and lightweight can be implemented by the sandwich panel, so that the processing with a high level of modification may be performed based on excellent moldability under welding while excellently maintaining the sandwich structure without an interlayer delamination phenomenon and a wrinkle occurrence phenomenon in the process of manufacturing the sandwich panel.

For example, the sandwich panel may be molded to have a concave part and a convex part by integrally molding the skin layer and the flocking core layer through pressing, and even in this case, the sandwich panel may be molded to have a desired shape without delamination of the skin layer and the flocking core layer or without wrinkle occurrence.

In another exemplary embodiment of the present disclosure, there is provided a sandwich panel structure formed by welding each other the sandwich panel as described above and at least one selected from the group consisting of a metal layer, the sandwich panel, and a combination thereof.

Specifically, at least two of the sandwich panels may be welded each other.

Figure 3:
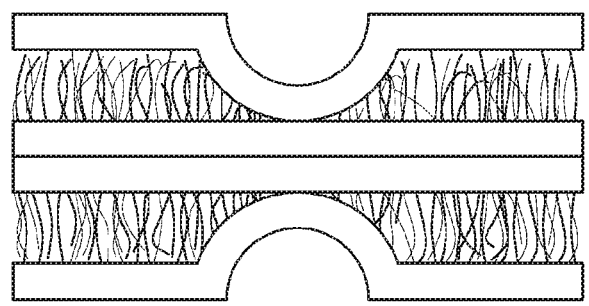
FIG. 3 schematically shows a cross section of a sandwich panel structure according to an exemplary embodiment of the present disclosure.

As shown in FIG. 3, the sandwich panel structure may be formed by stacking the sandwich panels so that the convex portions of the contact portions face each other, and welding the contact portions, wherein electric resistance welding may be applied.

The electric resistance welding used herein refers to a welding which is carried out by applying a current through a contact portion of bonding member and applying a pressure by using a resistance heat as generated. The electric resistance welding includes spot welding, seam welding, projection, butt welding, flash welding, and foil seam welding. Particularly, the spot welding causes a resistance heat generated through a large current for a short time while pressing a material to be welded between the electrodes so that welding local portions can be melted to join. The sandwich panel structure may be obtained by contacting the electrodes used for the spot welding to the contact portion of the sandwich panel according to the present disclosure and preparing a region corresponding to the contact portion as the welding local portion.

When the contact portion 30 is not present, the flocking core layer fails to conduct a current, and the resistance welding may not be performed. Accordingly, the contact portion may be formed to secure the support rigidity and mechanical strength for easier workability and moldability of the sandwich panel including the flocking core layer. In addition, a sandwich panel structure having excellent physical properties can be realized by applying a welding process to the contact portion.

The sandwich panel structure may have an electrical conductivity in the range of 100 Ωm to 1000 S/cm. This electrical conductivity is a property that can be obtained by forming the contact portion 30, which increases welding efficiency to have excellent moldability and workability for the sandwich panel. Within the electrical conductivity satisfying the above range, the sandwich panel may be stacked on each other or a metal layer, and electrodes may be brought into contact with the contact portions to form welding local portions and melt-bond them.

Figure 4:
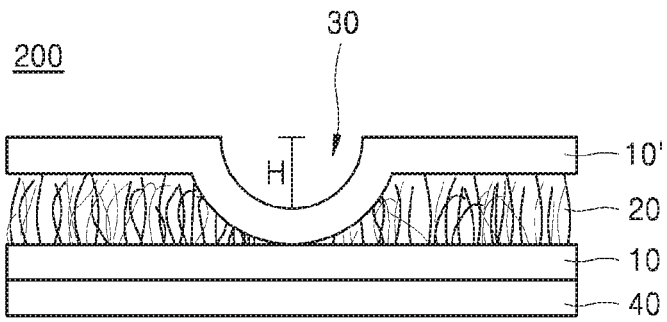
FIG. 4 schematically shows a cross section of a sandwich panel structure according to another exemplary embodiment of the present disclosure.

Also, referring to FIG. 4, the sandwich panel structure may include a metal layer, and the metal layer may be welded with the sandwich panel.

Specifically, the metal layer may include at least one selected from the group consisting of aluminum, galvanized steel sheet (GI), stainless steel, magnesium, and a combination thereof, and electro-galvanized steel sheet (EGI) is preferred. In addition, the metal layer may have a thickness of about 0.5 mm to about 1.5 mm. The welding local portion may be formed through the contact portion to weld the sandwich panel and the metal layer, whereby the sandwich panel according to the present disclosure can be stacked integrally with the metal layer, thereby emplementing a sandwich panel structure having excellent physical properties.

In a further exemplary embodiment of the present disclosure, there is provided a method for manufacturing a sandwich panel, the method including: preparing a sandwich panel comprising a flocking core layer and skin layers stacked on both sides of the flocking core layer, respectively; and applying heat and pressure to at least one surface of the skin layers to form at least one contact portion.

The sandwich panel 100 including the flocking core layer 20 and the skin layers 10 and 10' and further including the contact portion 30 can be manufactured by the method for manufacturing the sandwich panel. In this embodiment, the flocking core layer, the skin layer, and the contact portion are as described above.

The preparing a sandwich panel comprising a flocking core layer and skin layers stacked on both sides of the flocking core layer, respectively, may include preparing fibers. In this embodiment, the fibers are as described above. By preparing the flocking core layer using the fibers, the sandwich panel can have both improved moldability and excellent mechanical properties.

The method may further include forming an adhesive layer 22 on one surface of each skin layer, which may be a process of applying an adhesive to one surface of the skin layer. The skin layer and the adhesive layer are as described above. The method of applying the adhesive to one side of the one skin layer may be any one selected from a die coating method, a gravure coating method, a knife coating method, a bar coating method, and a spray coating method, but is not limited thereto.

In preparing the sandwich panel, the flocking core layer may be formed by a method of electrostatic deposition of the fibers. The flocking core layer may be formed by planting the fibers into an adhesive layer formed on one side of the skin layer. In this embodiment, the fibers may be planted on the adhesive layer by an electrostatic deposition method. Specifically, the flocking core layer may be prepared by pre-treating the fibers with electric charge, and then planting the fibers on the adhesive layer using an electrostatic field. The adhesive layer may then be cured to form the sandwich panel.

The forming the contact portion may be carried out by applying heat and pressure to a mold having a predetermined size capable of realizing the above-mentioned contact portion, wherein the contact portion may be formed by pushing the flocking core layer to come in contact with the skin layers on both sides. Since the flocking core layer is pushed, the two skin layers can be brought into contact with each other, so that the upper and lower metal plates are abutted each other. Therefore, current can flow through the entire sandwich panel when the current is supplied from one side.

In the method for manufacturing the sandwich panel or the sandwich panel structure, there are two methods for forming the contact portion and welding. The first method is a sequential method in which a contact portion is first formed in a mold and then general electric welding is performed. The second method is a method in which a welding rod is placed in the middle of a mold for forming a contact portion to perform welding even when forming the contact portion.

Specifically, the forming the contact portion may be performed at a pressure of about 0.2 MPa to about 1 MPa. By applying pressure in the above range, the sandwich panel is not likely to be crushed and the contact portion having an appropriate depth can be formed. In addition, since it is manufactured in a curved shape at the time of forming the contact portion, there is an advantage that no breakage or wrinkling occurs.

The forming the contact portion may be performed at a temperature of about 50° C. to about 150° C. When the temperature is less than about 50° C., the contact portion may not be formed well, whereas when the temperature is higher than about 150° C., the surroundings may melt at the time of forming the contact portion, thereby deteriorating the physical properties of the sandwich panel.

The sandwich panel includes a flocking core layer; and skin layers stacked on both sides of the flocking core layer, respectively, wherein the sandwich panel further includes at least one contact portion abutted by the two skin layers. Through the flocking core layer, excellent moldability and rigidity can be secured as compared to the conventional sandwich panels, and through the contact portion, the welding efficiency can be improved to enable welding with sandwich panels or with other metal layers, thereby widening the application range.

Figure 5:
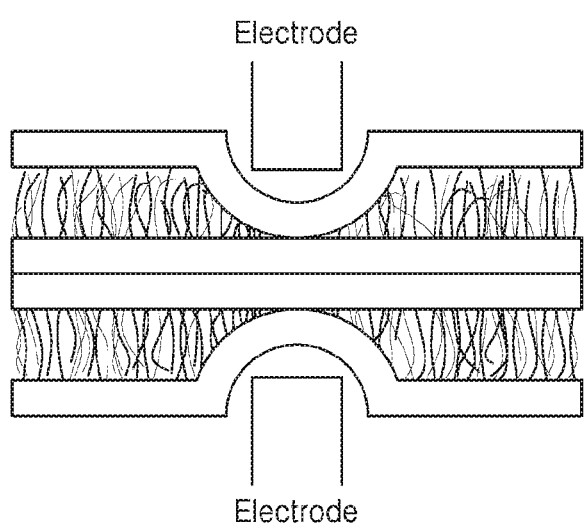
FIG. 5 schematically shows a welding between sandwich panels according to an exemplary embodiment of the present disclosure.

As shown in FIG. 5, the two exemplary sandwich panels manufactured through the above manufacturing method may be laminated so that the convex portions of the two contact portions face each other and the electrodes may be applied to each of the contact portions to perform spot welding. The contact portion allows a welding current to flow and enables a welding between the sandwich panels and allows a welding of the metal layers to a plurality of sandwich panels or at least one sandwich panel. Accordingly, a sandwich panel structure that realizes desired physical properties for various applications can be obtained.

Hereinafter, specific examples of the present disclosure will be provided. It is to be noted that Examples to be described below are provided merely for specifically exemplifying or explaining the present disclosure, and accordingly, the present disclosure is not limited to the following Examples.

Example 1

A polyamide fiber having an average cross-sectional area of 15 μm and an average length of 1.5 mm was prepared. Then, an electrogalvanized steel sheet skin layer having a thickness of 0.3 mm was prepared, and a thermosetting epoxy-based adhesive was applied to one side of the skin layer to a thickness of 0.2 mm. Then, the mixed fibers were planted on an upper part of the adhesive by an electrostatic deposition method. Then, another skin layer formed of the same material and having the same thickness as the above skin layer was prepared, and the thermosetting epoxy-based adhesive was applied to one side thereof to a thickness of 0.2 mm. Next, the another skin layer was stacked so that the adhesive portion applied to one side thereof was in contact with the flocking core layer, and subsequently, the thermosetting epoxy-based adhesive was thermally cured to obtain a sandwich panel.

Thereafter, the upper skin layer of the sandwich panel was thereto-pressed at a pressure of 0.7 MPa and a temperature of 100° C. with a die having a diameter of 10 mm to form a contact portion.

Comparative Example 1

A sandwich panel was prepared in the same manner as in Example 1 except that the step of forming the contact portion was omitted.

With respect to Example 1 and Comparative Example 1, four layers of materials for which electrical conductivity was to be obtained were laminated using a DC four-terminal method to measure a volume electrical conductivity. This method is a method of obtaining an average volume resistance, which was measured with 5 mm×5 mm area under a constant pressure of 50 to 150 N/cm².

As a result of the measurement, electric resistance welding between the panels or the metal layers in Example 1 was made possible because of high electrical conductivity, but In Comparative Example 1, electricity could not be conducted and could not be laminated by welding with other panels.

The invention claimed is:

1. A sandwich panel comprising:
   a flocking core layer, wherein the flocking core layer comprises fibers flocked to an adhesive layer, wherein the fibers comprises a polyamide fiber, and wherein a thickness of the flocking core layer ranges from 0.5 mm to 2.0 mm; and
   skin layers stacked on both sides of the flocking core layer, respectively,
   wherein the sandwich panel further comprises at least one contact portion abutted by both skin layers,
   wherein the at least one contact portion has a groove shape, and is formed by applying a pressure to at least one surface of the skin layer, and
   wherein a groove depth of the at least one contact portion ranges from 0.5 mm to 2.0 mm.

2. The sandwich panel of claim 1, wherein the contact portion has the number of 4 to 16 per unit area.

3. The sandwich panel of claim 1, wherein the fibers have an average cross-sectional diameter of 20 μm to 70 μm.

4. The sandwich panel of claim 1, wherein the fibers have an average length of 0.5 mm to 3 mm.

5. The sandwich panel of claim 1, wherein the adhesive layer comprises at least one selected from the group consisting of an epoxy-based adhesive, an acrylic adhesive, a silicone-based adhesive, a rubber-based adhesive, and a combination thereof.

6. The sandwich panel of claim 1, wherein the skin layer comprises at least one selected from the group consisting of aluminum, galvanized steel sheet (GI), stainless steel, magnesium, and a combination thereof.

7. A sandwich panel structure formed by welding the sandwich panel according to claim 1; and at least one selected from the group consisting of a metal layer, the sandwich panel, and a combination thereof.

8. The sandwich panel structure of claim 1, wherein at least two of the sandwich panels are welded each other.

9. The sandwich panel structure of claim 1, wherein the sandwich panel structure has an electrical conductivity of 100 S/cm to 1000 S/cm.

10. The sandwich panel structure of claim 1, wherein the metal layer comprises at least one selected from the group consisting of iron, stainless steel (SUS), aluminum, magnesium, copper, and a combination thereof.

11. A method for manufacturing a sandwich panel according to claim 1, comprising:
    preparing the flocking core layer and the skin layers stacked on both sides of the flocking core layer, respectively; and
    applying heat and pressure to at least one surface of the skin layers to form the at least one contact portion.

12. The method of claim 11, wherein in preparing the sandwich panel, the flocking core layer is formed by an electrostatic deposition of fibers.

13. The method of claim 11, wherein in forming the contact portion, the contact portion is formed by pressing the flocking core layer so that the skin layers on both sides are abutted each other.

14. The method of claim 11, wherein the forming the contact portion is performed at a pressure of 0.2 MPa to 1 MPa.

15. The method of claim 11, wherein the forming the contact portion is performed at a temperature of 50° C. to 150° C.

* * * * *